(12) United States Patent
Chan et al.

(10) Patent No.: US 8,275,642 B2
(45) Date of Patent: Sep. 25, 2012

(54) SYSTEM TO IMPROVE PREDICTIVE MAINTENANCE AND WARRANTY COST/PRICE ESTIMATION

(75) Inventors: Hoi Yeung Chan, New Canaan, CT (US); Trieu Can Chieu, Scarsdale, NY (US); Lawrence Shungwei Mok, Brewster, NY (US)

(73) Assignee: International Business Machines Corporation, Armonk, NY (US)

( * ) Notice: Subject to any disclaimer, the term of this patent is extended or adjusted under 35 U.S.C. 154(b) by 1404 days.

(21) Appl. No.: 11/625,129

(22) Filed: Jan. 19, 2007

(65) Prior Publication Data

US 2008/0177613 A1    Jul. 24, 2008

(51) Int. Cl.
*G06Q 10/00* (2012.01)
(52) U.S. Cl. ...... 705/7.11; 705/7.12; 705/302; 705/400; 702/181; 702/184
(58) Field of Classification Search .................. 705/7.11, 705/7.12, 302, 400; 702/181, 184
See application file for complete search history.

(56) References Cited

U.S. PATENT DOCUMENTS

| | | | | |
|---|---|---|---|---|
| 4,975,840 | A  * | 12/1990 | DeTore et al. | 705/4 |
| 5,465,321 | A  * | 11/1995 | Smyth | 706/20 |
| 5,479,576 | A  * | 12/1995 | Watanabe et al. | 706/25 |
| 6,922,684 | B1 * | 7/2005 | Aldridge et al. | 706/60 |
| 2002/0065698 | A1* | 5/2002 | Schick et al. | 705/8 |
| 2002/0143421 | A1* | 10/2002 | Wetzer | 700/100 |
| 2003/0033170 | A1* | 2/2003 | Bhatt et al. | 705/4 |
| 2003/0216888 | A1* | 11/2003 | Ridolfo | 702/181 |
| 2005/0081082 | A1* | 4/2005 | Brodie et al. | 714/4 |
| 2006/0069581 | A1* | 3/2006 | Chien et al. | 705/1 |

OTHER PUBLICATIONS

K. Xu, M. Xie, L. C. Tang, S. L. Ho, Application of neural networks in forecasting engine systems reliability, Applied Soft Computing, vol. 2, Issue 4, Feb. 2003, pp. 255-268, ISSN 1568-4946, DOI: 10.1016/S1568-4946(02)00059-5. (http://www.sciencedirect.com/science/article/B6W86-47FDBM4-2/2/db349e4159ec44acb7317ccdd93d03e6).*

K. Xu, M. Xie, L. C. Tang, S. L. Ho, Application of neural networks in forecasting engine systems reliability, Applied Soft Computing, vol. 2, Issue 4, Feb. 2003, pp. 255-268, ISSN 1568-4946, DOI: 10.1016/S1568-4946(02)00059-5. (http://www.sciencedirect.com/science/article/B6W86-4                    7FDBM4-2/2/db349e4159ec44acb7317ccdd93d03e6).*

Chen, Xiaosheng, Ph.D., Product quality and warranty cost. The University of Wisconsin—Milwaukee, 1991, 161 pages (Abstract).*

* cited by examiner

*Primary Examiner* — Lynda Jasmin
*Assistant Examiner* — Timothy Padot
(74) *Attorney, Agent, or Firm* — Scully, Scott, Murphy & Presser, P.C.; Daniel P. Morris, Esq.

(57) ABSTRACT

A method and system of predicting a maintenance schedule and estimating a cost for warranty service of systems, for example, hardware systems, is provided. The method and system in one aspect may collect component usage data and obtain component reliability data for each of the plurality of components. A component life distribution module (CLDM) may be constructed based on the real time component usage data and the component reliability data, and from CLDM a mean time to fail data may be obtained. A system life distribution model (SLDM) may be selected and the mean time to fail data input into the SLDM to obtain an operating environment index that represents the effect of environment conditions on the lifetime and reliability. A maintenance schedule may be predicted and an adjusted cost of warranty service may be calculated based on the operating environment index for each of the plurality of components.

19 Claims, 11 Drawing Sheets

FIG. 9

| COMPONENT | SERVER1 | SERVER2 | DISK1 | DISK2 | POWER1 | POWER2 |
|---|---|---|---|---|---|---|
| SERVER1 | 1 | | | | | |
| SERVER2 | | 1 | | | | |
| DISK1 | 1 | | 1 | | | |
| DISK2 | | 1 | | 1 | | |
| POWER1 | 1 | | 1 | | 1 | |
| POWER2 | | 1 | | 1 | | 1 |

FIG. 10B

System Reliability Dashboard

Rack: Rack2 ▶  Location:3  Status: Running

| Slot | Name | Status | MTTF index | M.Schedule | Health |
|---|---|---|---|---|---|
| Slot1 | stamford | on | 55 | Dec 30 2006 | Good |
| Slot2 | newcanaan | on | 10 | Dec 30 2006 | Alert |
| Slot3 | wilton | off | 55 | Dec 30 2006 | Good |
| Slot4 | darian | on | 54 | Dec 30 2006 | Good |
| Slot5 | westport | on | 53 | Dec 30 2006 | Good |
| Slot6 | greenwich | on | 39 | Dec 30 2006 | Good |
| Slot7 | riverdale | on | 60 | Dec 30 2006 | Good |
| Slot8 | norwalk | on | 25 | Dec 30 2006 | Good |
| Slot9 | newhaven | off | 55 | Dec 30 2006 | Good |
| Slot10 | bridgeport | off | 45 | Dec 30 2006 | Good |
| Slot11 | danbury | on | 49 | Feb 14 2007 | Good |

Refresh  Actions  Options  Help  Exit

SYSTEM TO IMPROVE PREDICTIVE MAINTENANCE AND WARRANTY COST/PRICE ESTIMATION

FIELD OF THE INVENTION

The invention relates generally to system maintenance, and more particularly to a system and method for predicting failure or life expectancy of critical systems and/or system components to determine system maintenance and warranty costs.

BACKGROUND INFORMATION

In general, equipment maintenance and repair services are integral parts of a typical service contract. Almost all outsourcing and/or service contracts include repair and maintenance services in addition to a standard warranty. Repair and maintenance services constitute a substantial part of the cost of a service contract. Typical repair and maintenance services include scheduled maintenance and unplanned repair services. The more frequent the planned and/or unplanned repair and maintenance services are, the higher the costs incurred by the maintenance provider resulting in a reduced service contract profit margin. Therefore, a solution or method to reduce scheduled or unplanned warranty repair and services of a service contract will add to the profitability of the service contract resulting in an overall profit increase for the company as a whole.

Traditionally, in addition to standard warranty service, a percentage of a service contract's value, or a fixed amount, is added to the service contract to cover maintenance and repair services. This additional cost is relatively uniform among all customers. Such a pricing model (for maintenance and repair outside the warranty period) does not accurately correlate with the actual cost of providing the maintenance and repair service. Customers with high maintenance and repair needs are charged at the same rate as customers with low maintenance and repair requirements. Such inflexibility in pricing is due to a lack of an accurate individual customer-based maintenance and repair-need prediction. This results in inefficient pricing and potentially lost profits (e.g., from undercharging) and reduced customer satisfaction (e.g., overcharging). It becomes essential to have a tool to predict maintenance and repair requirements based on customer's historical and actual operating conditions, and to provide a flexible and efficient pricing model for maintenance and repair services.

Typically, most warranty and maintenance charges are derived from the base cost of the equipment protected by the warranty and maintenance agreement. Most maintenance services are carried out on a predefined schedule, and repair services usually occur when there is a system or component failure. Currently, no adjustment is made to the cost of a warranty or service contract based on environmental factors and actual usage pattern that affect equipment failure rates.

SUMMARY OF THE INVENTION

A method and system of predicting a maintenance schedule and estimating a cost for warranty service of systems, for example, hardware systems, is provided. The method in one aspect may include collecting real-time component usage data for each of the plurality of components and obtaining component reliability data for each of the plurality of components. The method may further include constructing a component life distribution module (CLDM) for each of the plurality of components based on the real time component usage data and the component reliability data for each of the plurality of components, and obtaining from each CLDM a mean time to fail for each of the plurality of components. The method may also include selecting a system life distribution model (SLDM), and inputting the mean time to fail for each of the plurality of components into the SLDM to obtain an operating environment index for each of the plurality of components that represents the effect of environment conditions on the lifetime and reliability of each of the plurality of components. The method may further include predicting a maintenance schedule and calculating an adjusted cost of warranty service based on the operating environment index for each of the plurality of components.

A system of predicting a maintenance schedule and estimating a cost for warranty service in one aspect may comprise means adapted for carrying out the steps of the above-described methods. Further, a program storage device comprising instructions executable by a machine for carrying out the step of the above-described methods is provided.

Further features as well as the structure and operation of various embodiments are described in detail below with reference to the accompanying drawings.

BRIEF DESCRIPTION OF THE DRAWINGS

In the drawings, like reference characters generally refer to the same parts throughout the different views. In addition, the drawings are not necessarily to scale, emphasis instead generally being placed upon illustrating the principles of the invention.

FIG. 9 shows an example of a component dependency matrix.

FIGS. 10A and 10B show examples of screen shots illustrating the SRD.

DETAILED DESCRIPTION

It is well known that the reliability or the life expectancy of components in a single computer, an entire computer system, or any industrial system, is a function of the components' operating environment, especially the component's operating temperature. Currently, computer systems or other industrial systems are designed so that the constituent components operate within a specified temperature range in a predefined environment.

However, in real practice, the environment where these systems operate may not meet the manufacturer's temperature specifications at all times. For example, in a datacenter, the cooling air temperature and flow rate of the cooling air to a computer system that includes multiple processor racks may vary spatially and temporally. The fluctuation of the environmental conditions, such as temperature, will likely affect the reliability of the entire computer system. Furthermore, the temperature of each component in the computer system may vary depending on its computational loading. In general, increased load will result in higher operating temperature, and for a given hardware configuration, higher performance demands will also result in higher component temperature and hence higher component failure rate.

Figure 1:
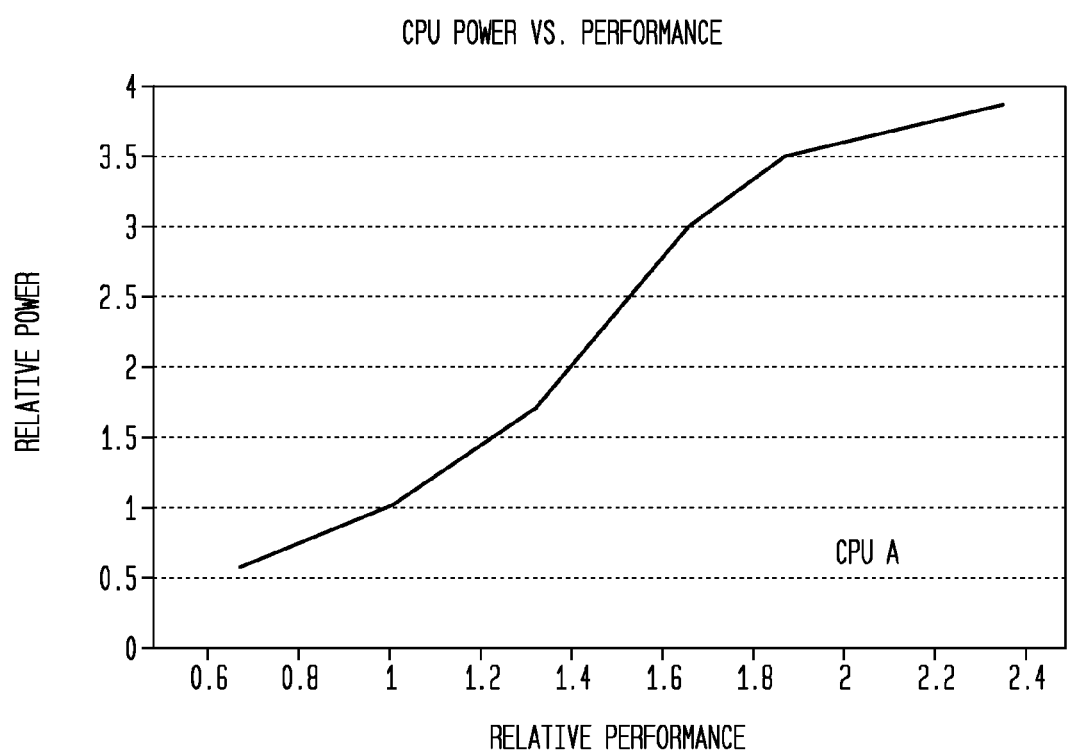
FIG. 1 is an illustrative graph of central processing unit (CPU) power vs. CPU performance.
Figure 2:
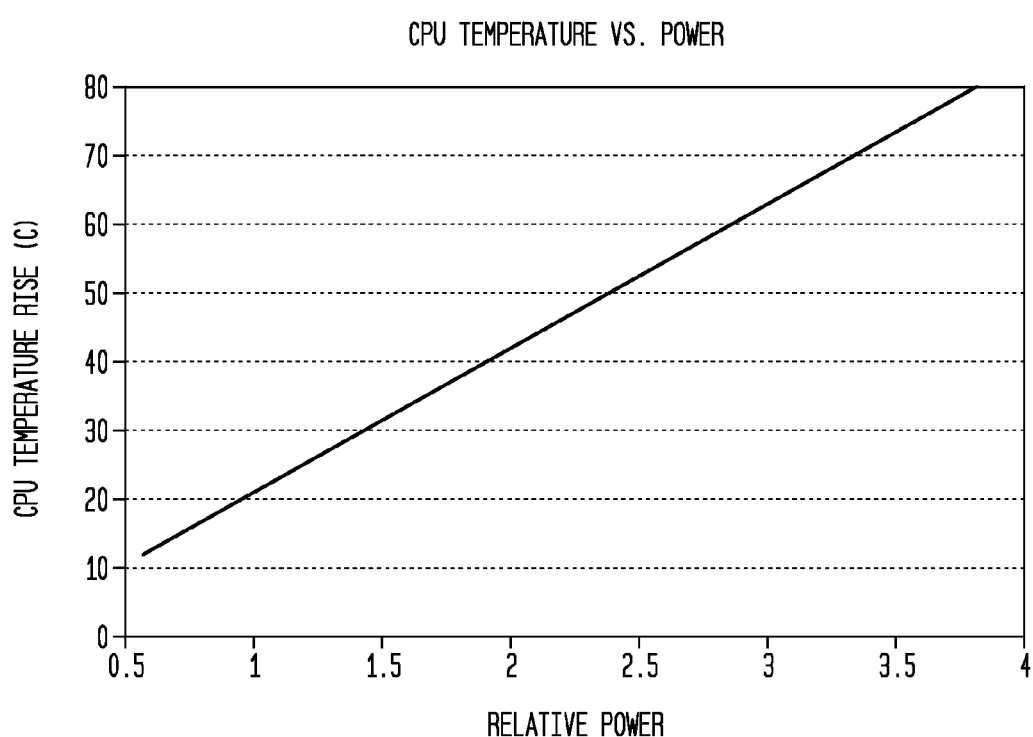
FIG. 2 is an illustrative graph of CPU temperature vs. power.
Figure 3:
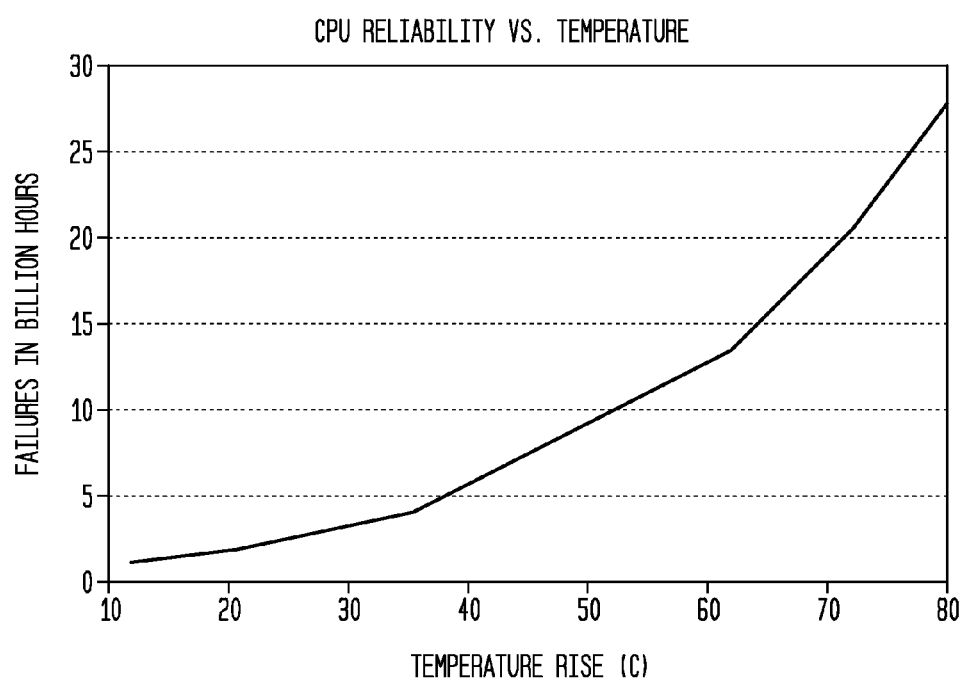
FIG. 3 is an illustrative graph of CPU reliability vs. temperature.

For example, computer power is a function of computer performance, as shown in FIG. 1. Temperature is a function of power, as shown in FIG. 2. Computer reliability is a function of temperature, as shown in FIG. 3. Reliability is a function of performance. These functional relationships are shown in the following equations.

$Pr=F(P)$, where $P$ is computer performance, $Pr$ is computer power, and $F(P)$ is their functional relationship.

$T=F(Pr)$, where $T$ is the lifetime temperature profile and $F(Pr)$ is the functional relationship.

$R=F(T)$, where $R$ is the computer reliability and $F(T)$ is the functional relationship.

$R=F(P,T,Pr)$.

$R_{overall}=R_{lab}-R_{adj}$, where $R_{overall}$ is the overall system reliability, $R_{lab}$ is the lab accelerated stress test projected reliability, and $R_{adj}$ is the reliability adjustment based on real time usage of the computer system. It follows that $R_{overall}=F(R_{lab},P,T,Pr)$.

Traditionally, the reliability prediction (i.e., failure prediction, life expectancy) of computer components and/or systems is based on laboratory accelerated stress tests and model based computer simulations. The problem with this approach is that these tests are preformed under a controlled environment with fixed parameters. These tests typically fail to factor in variations in temperature, workload, power fluctuation, etc., in real world operating condition of computer system and its environment. Such operating parameters are typically very difficult to model because of a wide variety of operating environments and workloads. As a result, component and system failure rates may vary significantly from the laboratory generated reliability data. This will likely result in unplanned repairs and decreased customer satisfaction if computer component and/or system failure occur earlier than predicted. This could also result in the customer incurring unnecessary maintenance expenses if component and/or system failure occurs later than expected.

The present invention in one embodiment solves the above-described problem by predicting the failure and life expectancy of critical system components based on accelerated test data (i.e., manufacturer laboratory determined mean time to failure), historical failure data (i.e., failure data reported from community usage), and real time monitoring, collection, and analysis of component usage and temperature cycles. The present invention in one embodiment determines how each critical component's failure rate is dependent on other components, projects the reliability of the entire system, and projects a maintenance and repair schedule for the entire system.

By monitoring a customer's usage patterns and operating condition of critical system components, the present invention in one embodiment provides information to adjust the original lab generated reliability data to produce a more accurate prediction of system and/or component failure rates.

The present invention in one embodiment also provides a means to establish the trade-offs between the reliability and the life expectancy of a hardware system due to variations in environmental conditions (e.g., temperature and humidity) of components and the system's performance and loading.

Hardware systems that can benefit from the present invention may include computer systems (either multiple computing units in a rack or multiple computer racks in a datacenter), various industrial systems, or scientific testing systems.

Figure 4:
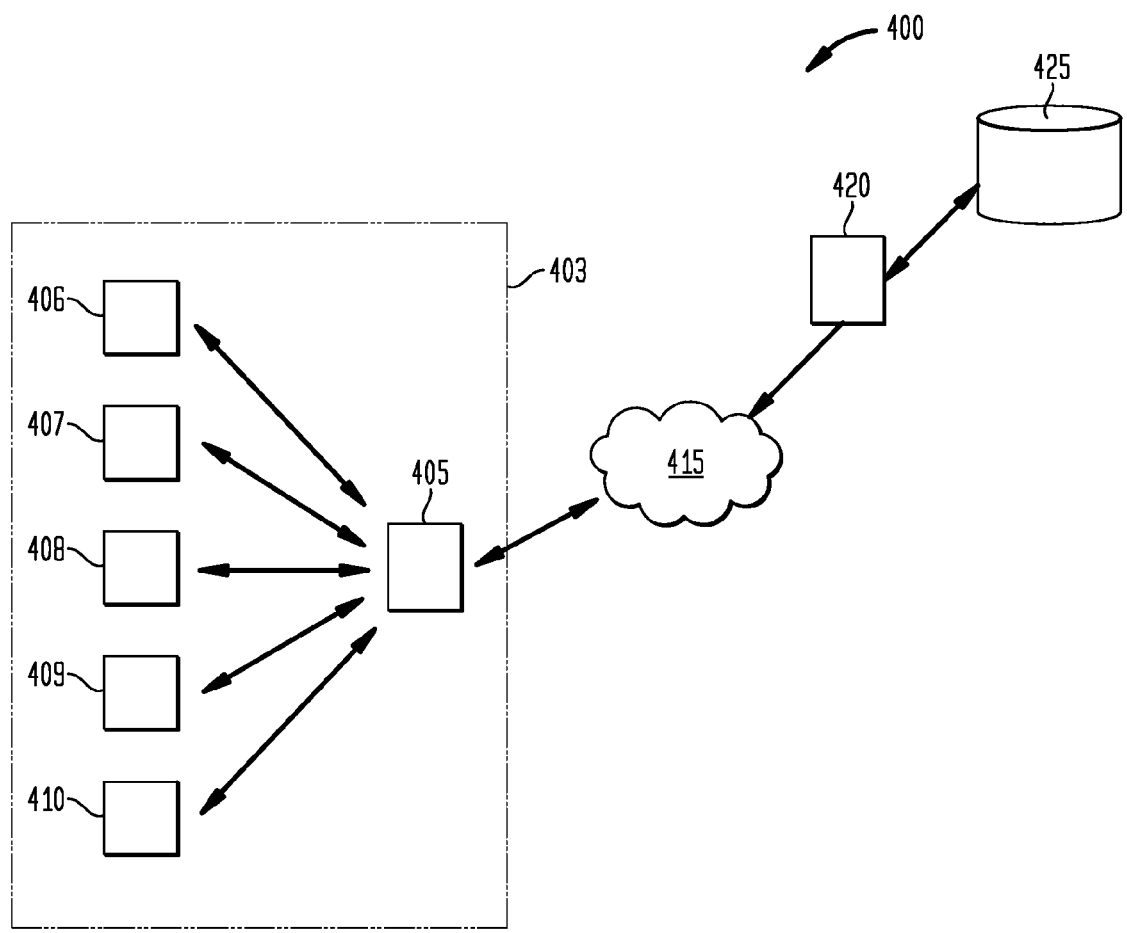
FIG. 4 is an illustrative block diagram of a system configuration employing a predictive maintenance program, according to one embodiment of the invention.

Referring to FIG. 4, in one embodiment, a block diagram of a system configuration 400 employing a predictive maintenance program according to the present invention is shown. The system configuration 400 may include a customer computer system 403. The customer computer system 403 may include a server 405 in communication with various system components 406, 407, 408, 409, and 410. Such components can include computer racks, automated industrial machinery, and/or client computers, for example. The server 405 may include memory (e.g., random access memory (RAM)) and a mass storage device (e.g., hard disk). The server 405 is also in communication with a communication network 415 (such as the internet or World Wide Web, LAN, or WAN, for example). The system configuration 400 also may include a service and maintenance company server 420 and database 425.

The predictive maintenance program of the present invention in one embodiment resides on the hard disk and executes in the RAM of the customer server 405. The predictive maintenance program includes a service agent that monitors critical components in the various system components 405, 406, 407, 408, 409, and 410 via sensors (not shown) in communication with the server 405. The service agent periodically collects data regarding the critical components in the various system components 405, 406, 407, 408, 409, and 410 via the sensors, makes various calculations (discussed in detail below), and transmits the results of the various calculations via the communication network 415 to the service and maintenance company server 420.

In one embodiment, one or more modules such as software residing and executing on the service and maintenance company server 420 uses the calculated results transmitted from the server 405 to estimate the life expectancy of the customer's system 403, project a maintenance and repair schedule for the entire system 403, and adjust the cost of maintenance and/or warranty service. The service and maintenance company server 420 transmits this information back to the server 405 over the communication network 415 for viewing by the customer.

Figure 5:
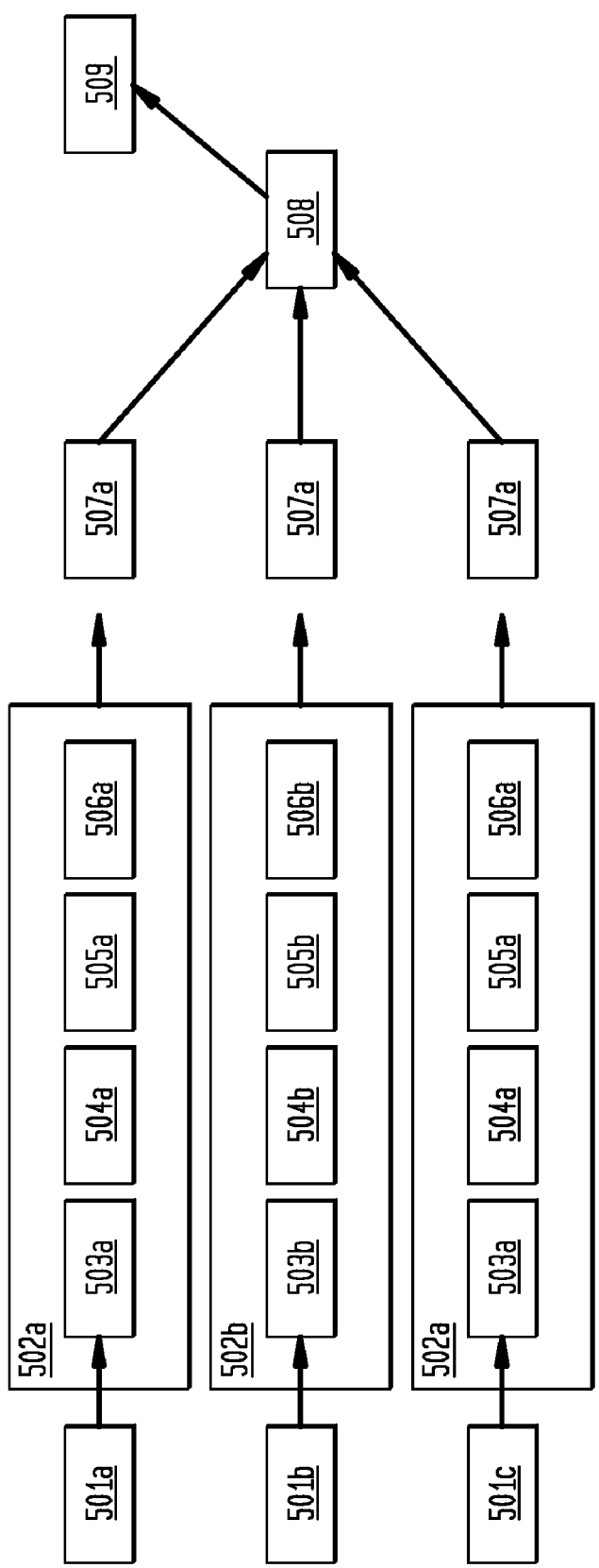
FIG. 5 is an illustrative block diagram of the components of the predictive maintenance program used for determining system reliability based on individual component usage, according to one embodiment of the invention.

Referring to FIG. 5, in one embodiment, a block diagram of the components of the predictive maintenance program used for determining system reliability based on individual component usage is shown. For each critical component 501a-c in system 403, a Component Life Distribution Model (CLDM) 502a-c is constructed. The CLDMs 502a-c are constructed from the real time usage data 503a-c (obtained from monitoring the usage of the components 501a-c), and component reliability data. Component reliability data includes accelerated test data 505a-c, component current usage profiles (historical failure data) 504a-c, and current component reliability projections 506a-c. The CLDM may be constructed locally on the customer computer. The application may be considered as part of the administrative and management application suit on the customer's computers. Alternatively, customer may choose to let the service and maintenance company run this application remotely.

Typically, most hardware systems (e.g., computer systems) are equipped with sensors to monitor temperatures of major components (e.g., system boards, CPUs, and hard drives), the voltages from the power supplies, and the functioning of cooling fans. This data is collected, recorded, and analyzed with CLDMs 502$a$-$c$ of each critical component 501$a$-$c$, respectively.

Accelerated test data 505$a$-$c$ includes component failure data that is obtained from an extrapolation of real lifetime behavior of each component 501$a$-$c$. A component is operated in a laboratory at temperatures significantly higher than typical operating temperatures to determine lifetime failure rates (i.e., lab mean time to failure).

The current component reliability projections 506$a$-$c$ for components 501$a$-$c$ may include any data from a previous analysis by the predictive maintenance program of the present invention, if any.

The CLDMs 502$a$-$c$ are used to produce for each critical component 501$a$-$c$ adjusted mean time to failure (MTTF) rates 507$a$-$c$. Because each CLDM 502$a$-$c$ is based, in part, on real time component usage data, each CLDM 502$a$-$c$ is a calculation of each component's currently adjusted MTTF rate 507$a$-$c$. In other words, each component's adjusted MTTF rate 507$a$-$c$ can be repeatedly obtained over the lifetime of the component as the component is used in the system 403.

The adjusted MTTFs 507$a$-$c$ are then input into a System Life Distribution Model (SLDM) 508 to produce a component dependency matrix 509. Each component in a system has its own reliability projection. The components of the system are dependent upon each other such that if one component fails, other components may also fail. For example, if a system power supply fails, system memory may also fail. The component dependency matrix tells how each component's failure rate is dependent on other components. The component dependency matrix is also used to project the reliability of the entire system and therefore project a maintenance and repair schedule for the entire system.

The SLDM may be constructed locally on the customer computer. The application may be considered as part of the administrative and management application suit on the customer's computers. Alternatively, customer may choose to let the service and maintenance company run this application remotely. An example of a component dependency matrix is shown in FIG. 9. In this component dependency matrix, the column under each of the component indicates the components that it depends on. For instance, the reliability of Server1 is dependent on itself, Disk1 and Power1. Disk2 is dependent on itself and Power2.

In one embodiment of the present invention, the individual failure rates of the critical components in the system 403 are used to determine an overall system failure rate. The SLDM may use any one of a variety of predictive models known or will be known, including but not limited to, a Bayesian network, a neural network, or a Markov chain. The predictive model chosen may be determined according to customer preference, the data available, and available computing resources.

Figure 10A:
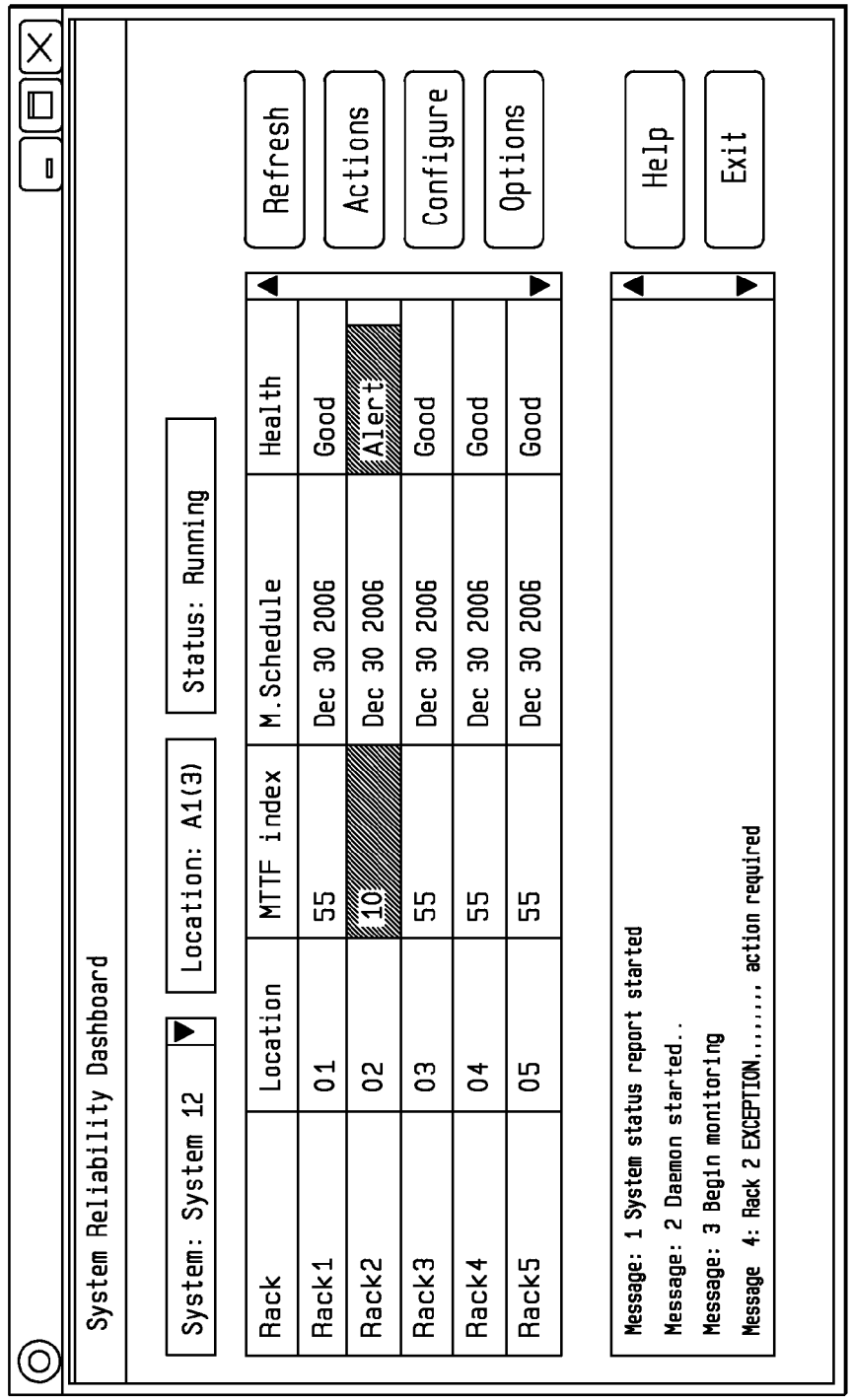

The component dependency matrix can be viewed by the customer via a system reliability dashboard (SRD) In one embodiment, the SRD is simply a graphical user interface (GUI) (part of the predictive maintenance program) that displays to the customer component and system reliability and failure rate information. The SRD also may display maintenance and repair schedules. FIGS. 10A and 10B show examples of screen shots illustrating the SRD. FIG. 10A shows an example of a rack view, and FIG. 10B shows and example of individual slot view.

Figure 6:
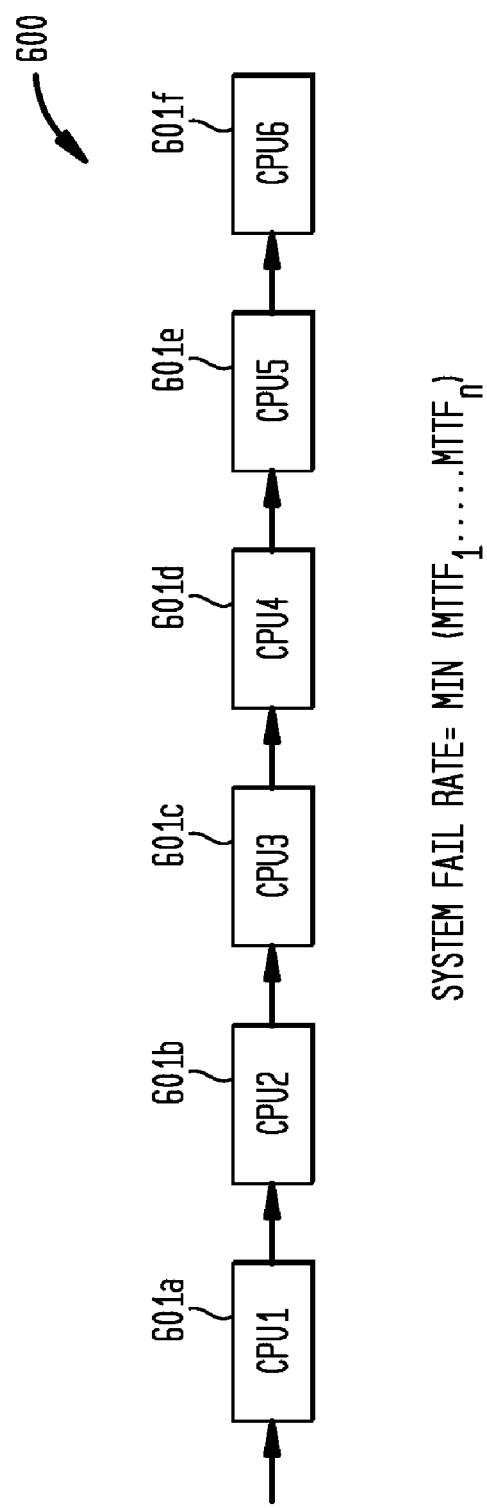
FIG. 6 is an illustrative block diagram of a system of six CPUs in series

Referring to FIG. 6, as an example, a block diagram of a system 600 including six CPUs 601$a$-$f$ in series is shown. Each CPU 601$a$-$f$ has a MTTF. In this case, the overall system failure rate is simply the minimum MTTF, as shown by the following equation.

$$\text{Overall System Failure} = \text{MIN}(\text{MTTF}_a, \ldots \text{MTTF}_f).$$

Figure 7:
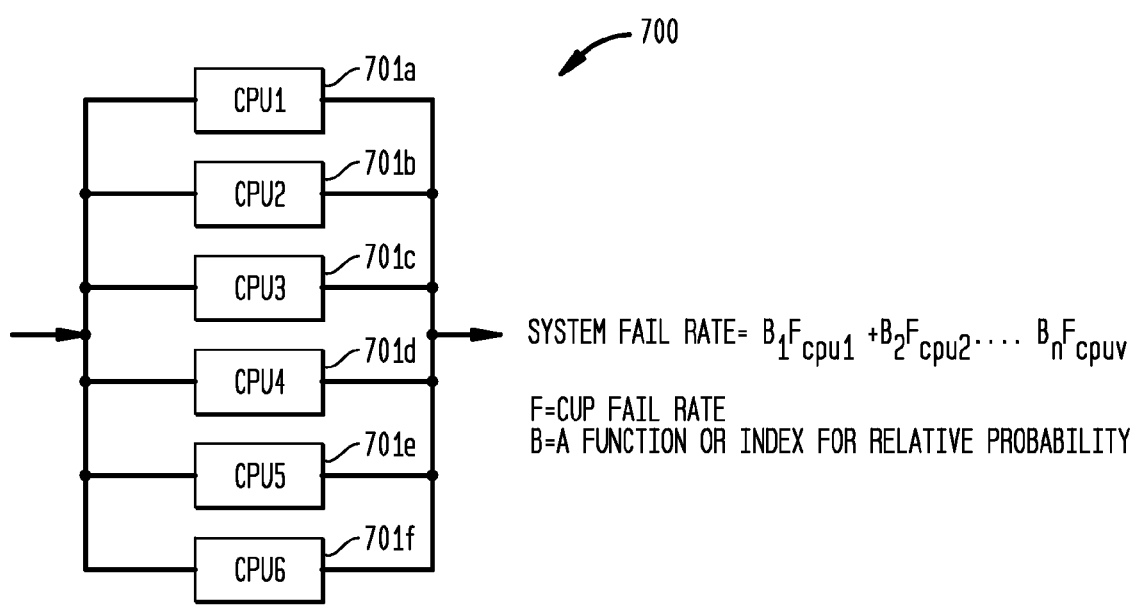
FIG. 7 is an illustrative block diagram of system of six CPUs in parallel.

Referring to FIG. 7, as another example, a block diagram of system 700 of six CPUs 701$a$-$f$ in parallel is shown. Again, each CPU 701$a$-$f$ has a MTTF. In this case the overall system failure is determined by the following equation.

$$\text{Overall System Failure} = B_1 \text{MTTF}_a + B_2 \text{MTTF}_b \ldots + B_6 \text{MTTF}_f, \text{ where } B_{1 \ldots 6} \text{ are the indexes of relatively probabilities of failure for CPUs 701}a\text{-}f, \text{ respectively.}$$

Using the MTTF for each component, the SLDM is also used to calculate an Operating Environment Index (OEI) for each critical component to represent the effect of environment conditions on the lifetime and reliability of each critical component in the hardware system. The following description illustrates how OEI may be computed. The OEI is a number greater than zero. If the environment adjusted MTTF of a component is the same as the laboratory projected MTTF, the OEI is set to zero, which indicates that there is no effect on the MTTF of the component due to environmental factors. If the environment adjusted MTTF of the component is less than the laboratory projected MTTF, the OEI is computed as shown in the following equation.

$$\text{OEI} = (\text{MTTF}_{lab} - \text{MTTF}_{adjusted})/\text{MTTF}_{lab}.$$

OEI is an index representing the effect of environment on MTTF.

Based on the OEI, four additional indices are calculated. These indices include: an Instantaneous Operating Environment Index (IOEI), a System Instantaneous Operating Environment Index (SIOEI), a Cumulative Operating Environment Index (COEI), and a System Cumulative Operating Environment Index (SCOEI).

The IOEI represents the current index of each critical component as a result of the current cycle of evaluation. The IOEI is the OEI of the current cycle of measurement and analysis of a particular component. IOEI may be shown to the customer via the SRD for information or alert purposes. The IOEI may be used to trigger corrective action (e.g., redistribute component loading or adjust environmental conditions).

The SIOEI represents the overall system IOEI based on the system's critical components. Each component is assigned a weight W to represent its importance in the overall system. The SIOEI is computed using the following equation.

$$\text{SIOEI} = (W_{component\ 1} * \text{IOEI}_{component\ 1} + W_{component\ 2} * \text{IOEI}_{component\ 2} \cdots + W_{component\ n} * \text{IOEI}_{component\ n})/n, \text{ where } n \text{ is the number of system components.}$$

The SIOEI may be shown to the customer via the SRD for information or alert purposes. The SIOEI may be used to trigger corrective action (e.g., redistribute component loading or adjust environmental conditions).

The COEI represents the cumulative effect of environmental conditions on the corresponding component. COEI is computed using the following equation.

$$\text{COEI} = (\text{IOEI}_1 + \text{IOEI}_2 + \ldots \text{IOEI}_n)/n, \text{ where the } IOEIs \text{ are the instantaneous } OEIs \text{ of each cycle } (n) \text{ of measurement and analysis of the component. The COEI may be shown to the customer via the SRD for information or alert purposes. The}$$

COEI may be used to trigger corrective action (e.g., redistribute component loading or adjust environmental conditions).

The SCOEI represents the overall system COEI based on its critical components. Each critical component is assigned a weight W to represent its importance in the overall system. The SCOEI is computed using the following formula.

$$SCOEI = (W_{component\ 1} * COEI_{component\ 1} + W_{component\ 2} * COEI_{component\ 2} \cdots + W_{component\ n} * COEI_{component\ n})/n,$$ where $n$ is the number of system components.

The SCOEI may be shown to the customer via the SRD for information or alert purposes. The SCOEI may be used to trigger corrective action (e.g., redistribute component loading or adjust environmental conditions).

The adjustment to cost of maintenance/warranty services is then computed using the following equation.

$$Cost_{adj} = C_{base} * (1 + F(SCOEI)),$$ where $Cost_{adj}$ is the adjusted cost maintenance and/or warranty services, $C_{base}$ is the cost of maintenance and/or warranty services based on laboratory generated reliability data, and $F(SCOEI)$ is a user defined function for adjustment. The simplest case is when SCOEI is used directly as a scaling factor as shown in the following equation.

$$Cost_{adj} = C_{base} * (1 + SCOEI).$$

Figure 8:
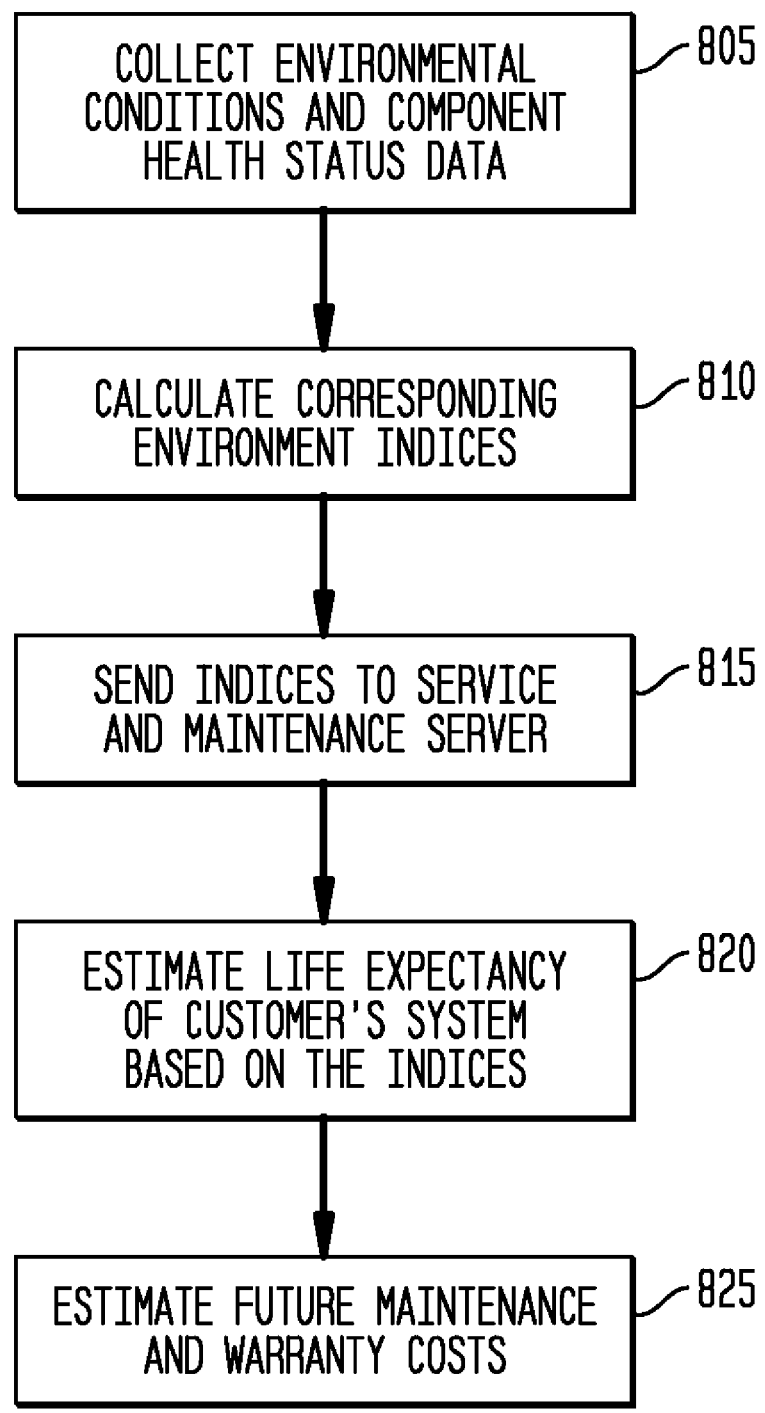
FIG. 8 is an illustrative flow diagram of the operation of a predictive maintenance program, according to one embodiment of the invention.

Referring to FIG. 8, in one embodiment, a flow diagram of the operation of the present invention is shown. A customer who owns computing or other industrial equipment has signed a service contract with a system service and maintenance company, and agreed to install the predictive maintenance software (which includes service agents) on the computing or industrial equipment to collect data about the environmental conditions and component health status periodically (Step 805). The service agents then calculate the corresponding environmental indices accordingly (Step 810), for example, the OEI, IOEI, SIOEI, COEI and SCOEI. As described above, the indices in one embodiment are determined by constructing the CLDM, determining MTTF and the SLDM for each component to derive the component dependency matrix. The resulting indices are then sent (via the communication network if these indices are construction on the customer's computers) to the service and maintenance company server for further processing (Step 815). The service and maintenance company then utilizes these indices to adjust their service and maintenance schedule or their resource planning. The processing step in the service and maintenance company may include utilizing these indices to adjust their planning and service scheduling as well as using them to further refine their cost and the pricing model. How these indices are utilized may depend on the service and maintenance company's own software applications. In one embodiment, the CLDM and/or SLDM may be produced on the customer's computers locally or remotely on the service and maintenance company's computers.

The service and maintenance company then executes a life expectancy prediction software program to estimate the life expectancy of the customer's system based on the environmental indices received from the customer as well as the lab accelerated stress test and component field failure data (Step 820). A life expectancy prediction software program may be a separate software component utilizing all the indices produced by the models. The results of this prediction software program are used to estimate future maintenance and warranty costs (Step 825).

Using the instant invention, the cost of future maintenance and warranty can be tailored to the actual usage and environmental factors of the client system. Furthermore, the sensitive component failure data can be safely guarded within the service & maintenance company.

Variations, modifications, and other implementations of what is described herein may occur to those of ordinary skill in the art without departing from the spirit and scope of the invention. For example, while the examples of components referred to hardware system components, the method and system of the present disclosure may be applicable to other components. Accordingly, the invention is not to be defined only by the preceding illustrative description.

We claim:

1. A computer-implemented method of predicting a maintenance schedule for a system comprising a plurality of components and estimating a cost for warranty service of the system, the method comprising the steps performed by a computer of:

collecting real-time component usage data for each of the plurality of components;

obtaining component reliability data for each of the plurality of components;

constructing, by a processor, a component life distribution module (CLDM) for each of the plurality of components based on the real time component usage data and the component reliability data for each of the plurality of components;

obtaining from each CLDM a mean time to fail for each of the plurality of components;

selecting a system life distribution model (SLDM);

inputting the mean time to fail for each of the plurality of components into the SLDM to obtain an operating environment index for each of the plurality of components that represents the effect of environment conditions on the lifetime and reliability of each of the plurality of components; and predicting a maintenance schedule and calculating an adjusted cost of warranty service based on the operating environment index for each of the plurality of components, wherein the calculating further includes determining an instantaneous operating environment index (IOEI) representing current cycle of measurement for each of the plurality of components, determining a cumulative operating environment index (COEI) representing a cumulative effect of environmental conditions on each of the plurality of components using $COEI = (IOEI_1 + IOEI_2 + \ldots IOEI_n)/n$, where n represents a cycle of measurement, and determining a system cumulative operating environment index (SCOEI) representing an overall system's cumulative operating environment index using $SCOEI = (W_{component\ 1} * COEI_{component\ 1} + W_{component\ 2} * COEI_{component\ 2} \cdots + W_{component\ n} * COEI_{component\ n})/m$, where m is number of system components and W represents a weight value associated with each of the system components, and the adjusted cost is determined using $Cost_{adj} = C_{base} * (1 + F(SCOEI))$, where $Cost_{adj}$ is the adjusted cost, $C_{base}$ is a cost of maintenance and/or warranty services based on laboratory generated reliability data, and F(SCOEI) is a user defined function for adjustment.

2. The method of claim 1, wherein component reliability data comprises at least one of accelerated test data, component current usage profiles, and current component reliability projections.

3. The method of claim 1, wherein selecting a system life distribution model comprises selecting a Bayesian network, a neural network, or a Markov chain predictive model.

4. The method of claim 1, further comprising calculating a System Cumulative Operating Environment Index representing an overall system's instantaneous operating environment index for a current cycle of measurement.

5. The method of claim 1, wherein calculating an adjusted cost of warranty service comprises multiplying a base cost of warranty service by a System Cumulative Operating Environmental Index.

6. The method claim 1, wherein the plurality of components include components of a hardware system.

7. The method of claim 1, wherein the step of inputting further includes producing a component dependency matrix from the SLDM and the inputted mean time to fail.

8. The method of claim 7, further including presenting the component dependency matrix in a dashboard view.

9. The method of claim 8, wherein the dashboard view includes repair and maintenance schedules.

10. A program storage device readable by a machine, tangibly embodying a program of instructions executable by the machine to perform method steps for predicting a maintenance schedule for a system comprising a plurality of components and estimating a cost for warranty service of the system, the method steps comprising:
collecting real-time component usage data for each of the plurality of components;
obtaining component reliability data for each of the plurality of components;
constructing a component life distribution module (CLDM) for each of the plurality of components based on the real time component usage data and the component reliability data for each of the plurality of components;
obtaining from each CLDM a mean time to fail for each of the plurality of components;
selecting a system life distribution model (SLDM);
inputting the mean time to fail for each of the plurality of components into the SLDM to obtain an operating environment index for each of the plurality of components that represents the effect of environment conditions on the lifetime and reliability of each of the plurality of components; and
predicting a maintenance schedule and calculating an adjusted cost of warranty service based on the operating environment index for each of the plurality of components,
wherein the calculating further includes determining an instantaneous operating environment index (IOEI) representing current cycle of measurement for each of the plurality of components, determining a cumulative operating environment index (COEI) representing a cumulative effect of environmental conditions on each of the plurality of components using $COEl = (IOEl_1 + IOEl_2 + \ldots IOEl_n)/n$, where n represents a cycle of measurement, and determining a system cumulative operating environment index (SCOEI) representing an overall system's cumulative operating environment index using $SCOEl = (W_{component\ 1} * COEl_{component\ 1} + W_{component\ 2} * COEl_{component\ 2} \ldots + W_{component\ n} * COEl_{component\ n})/m$, where m is number of system components and W represents a weight value associated with each of the system components, and the adjusted cost is determined using $Cost_{adj} = C_{base} * (1 + F(SCOEl))$, where $Cost_{adj}$ is the adjusted cost, $C_{base}$ is a cost of maintenance and/or warranty services based on laboratory generated reliability data, and F(SCOEl) is a user defined function for adjustment.

11. The program storage device of claim 10, wherein component reliability data comprises at least one of accelerated test data, component current usage profiles, and current component reliability projections.

12. The program storage device of claim 10, wherein selecting a system life distribution model comprises selecting a Bayesian network, a neural network, or a Markov chain predictive model.

13. The program storage device of claim 10, further comprising calculating a System Cumulative Operating Environment Index representing an overall system's instantaneous operating environment index for a current cycle of measurement.

14. The program storage device of claim 10, wherein calculating an adjusted cost of warranty service comprises multiplying a base cost of warranty service by a System Cumulative Operating Environmental Index.

15. The program storage device of claim 10, wherein the plurality of components include components of a hardware system.

16. The program storage device of claim 10, wherein the step of inputting further includes producing a component dependency matrix from the SLDM and the inputted mean time to fail.

17. The program storage device of claim 16, further including presenting the component dependency matrix in a dashboard view.

18. A computer system for predicting a maintenance schedule for a system comprising a plurality of components and estimating a cost for warranty service of the system, the computer system comprising:
a processor;
a service agent module for collecting real-time component usage data for each of the plurality of components;
a first module for obtaining component reliability data for each of the plurality of components;
the first module further for constructing a component life distribution module (CLDM) for each of the plurality of components based on the real time component usage data and the component reliability data for each of the plurality of components;
the first module further for obtaining from each CLDM a mean time to fail for each of the plurality of components;
the first module further for selecting a system life distribution model (SLDM);
the first module further for inputting the mean time to fail for each of the plurality of components into the SLDM to obtain an operating environment index for each of the plurality of components that represents the effect of environment conditions on the lifetime and reliability of each of the plurality of components; and
a second module for predicting a maintenance schedule and calculating an adjusted cost of warranty service based on the operating environment index for each of the plurality of components,
wherein the calculating further includes determining an instantaneous operating environment index (IOEI) representing current cycle of measurement for each of the plurality of components, determining a cumulative operating environment index (COEI) representing a cumulative effect of environmental conditions on each of the plurality of components using $COEl = (IOEl_1 + IOEl_2 + \ldots IOEl_n)/n$, where n represents a cycle of measurement, and determining a system cumulative operating environment index (SCOEl) representing an overall system's cumulative operating environment index using $SCOEl = (W_{component\,1} * COEl_{component\,1} + W_{component\,2} * COEl_{component\,2} \cdots + W_{component\,n} * COEl_{component\,n})/m$, where m is number of system components and W represents a weight value associated with each of the system components, and the adjusted cost is determined using $Cost_{adj} = C_{base} * (1 + F(SCOEl))$, where $Cost_{adj}$ is the adjusted cost, $C_{base}$ is a cost of maintenance and/or warranty services based on laboratory generated reliability data, and F(SCOEl) is a user defined function for adjustment.

19. The system of claim 18, wherein the means for collecting real-time component usage data comprises a plurality of sensors for monitoring the plurality of components.

* * * * *